(12) United States Patent
Johnsen et al.

(10) Patent No.: US 7,211,965 B2
(45) Date of Patent: May 1, 2007

(54) HIGH INTENSITY DISCHARGE LAMP WITH CURRENT SENSE RESISTOR

(75) Inventors: Andrew O. Johnsen, Danvers, MA (US); Bernhard Ertl, Munich (DE); Guy P. Bouchard, Beverly, MA (US); Vipin Madhani, Burlington, MA (US)

(73) Assignee: Osram Sylvania Inc., Danvers, MA (US)

(*) Notice: Subject to any disclaimer, the term of this patent is extended or adjusted under 35 U.S.C. 154(b) by 0 days.

(21) Appl. No.: 10/985,557

(22) Filed: Nov. 10, 2004

(65) Prior Publication Data

US 2005/0040771 A1 Feb. 24, 2005

(51) Int. Cl.
*H05B 37/02* (2006.01)

(52) U.S. Cl. .................. 315/219; 315/209 R; 315/291

(58) Field of Classification Search ............... 315/307, 315/308, 209, 291, 209 R, 212, 219, 224, 315/226, 246, 276
See application file for complete search history.

(56) References Cited

U.S. PATENT DOCUMENTS

| | | | |
|---|---|---|---|
| 4,170,747 A | 10/1979 | Holmes | 315/307 |
| 4,477,748 A * | 10/1984 | Grubbs | 315/306 |
| 4,912,374 A | 3/1990 | Nagase et al. | 315/244 |
| 5,365,150 A * | 11/1994 | Shiomi et al. | 315/209 R |
| 5,384,518 A * | 1/1995 | Kido et al. | 315/225 |
| 6,124,681 A * | 9/2000 | Choi | 315/291 |
| 6,188,180 B1 | 2/2001 | Diamond | 315/289 |
| 6,288,501 B1* | 9/2001 | Nakamura et al. | 315/307 |
| 6,294,879 B1* | 9/2001 | Nagase et al. | 315/209 R |
| 6,380,694 B1 | 4/2002 | Uchihashi et al. | 315/244 |
| 6,781,326 B2* | 8/2004 | Stack | 315/307 |
| 6,946,807 B2* | 9/2005 | Okamoto et al. | 315/291 |
| 7,012,381 B2* | 3/2006 | Samejima et al. | 315/219 |
| 2003/0173911 A1* | 9/2003 | Ohsawa | 315/291 |
| 2004/0251852 A1* | 12/2004 | Kambara et al. | 315/291 |
| 2005/0057181 A1* | 3/2005 | Izumi et al. | 315/209 R |
| 2005/0212463 A1* | 9/2005 | Wei | 315/308 |

* cited by examiner

*Primary Examiner*—Trinh Dinh
*Assistant Examiner*—Tung Le
(74) *Attorney, Agent, or Firm*—Carlo S. Bessone

(57) ABSTRACT

A circuit for operating a high intensity discharge (HID) lamp includes an H-bridge connected between a common terminal and a power line, and a control circuit connected to the H-bridge. The control circuit includes a transformer having a primary winding connected between the common terminal and a power terminal and a secondary winding connected between the common terminal and the power line, and a current sense resistor connected in series between the secondary winding and the common terminal. The HID lamp is connected to the common terminal and to the second winding so as sense a current across the current sense resistor.

2 Claims, 1 Drawing Sheet

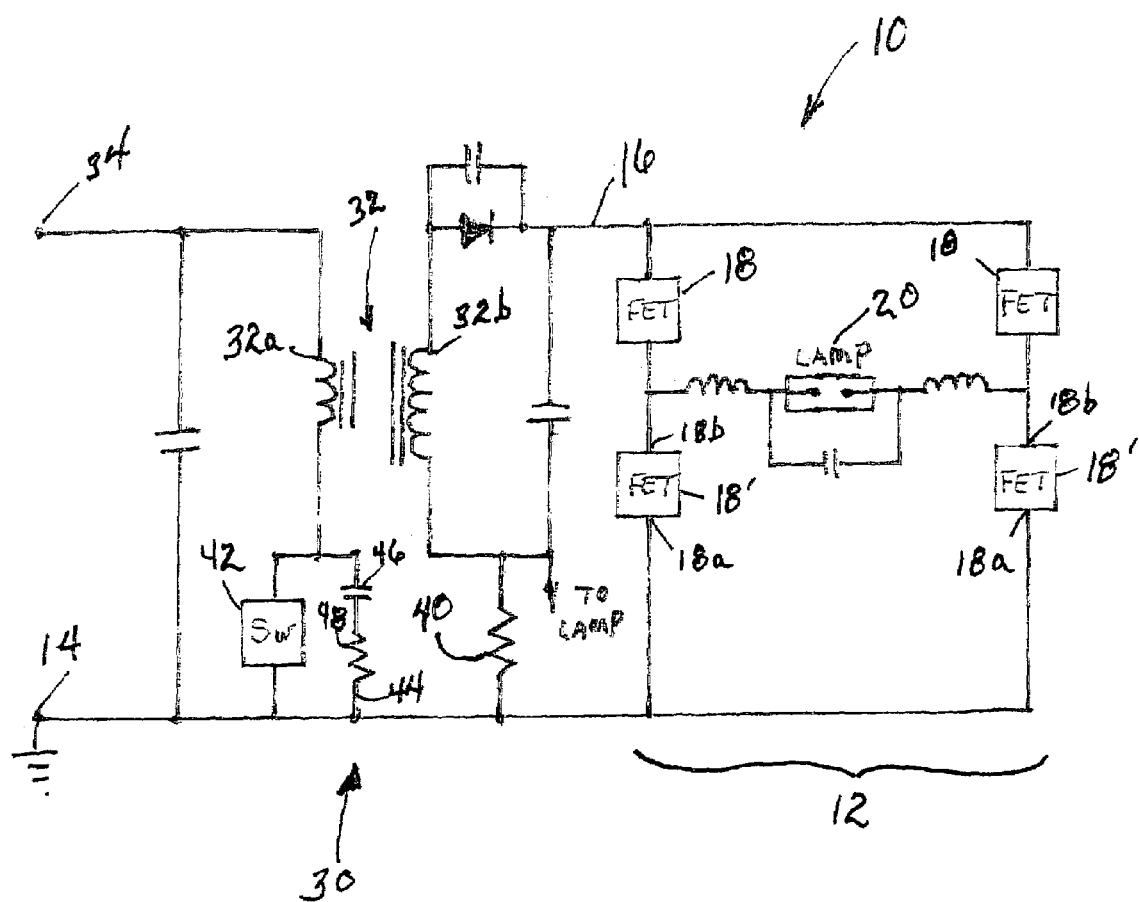

HIGH INTENSITY DISCHARGE LAMP WITH CURRENT SENSE RESISTOR

BACKGROUND OF THE INVENTION

The present invention is directed to a circuit for operating a high intensity discharge (HID) lamp. More particularly, the circuit is for automotive lamp applications.

HID lamps sense the current in the lamp to regulate lamp power. A known technique for sensing current is to connect a resistor in series between ground and the lamp (see, for example, U.S. Pat. Nos. 4,170,747 and 6,389,694). In such lamps, during lamp run-up the current in the lamp is limited to, for example, 2.5 amps for lamps containing mercury and 4 amps for mercury-free lamps. If a 0.68 ohm resistor is used to sense lamp current, there is a 1.7 volt drop across the resistor. Since this voltage drop is felt in the field effect transistors (FETs) of the H-bridge lamp driver connected to ground, a level shift circuit must be added to drive these FETs.

SUMMARY OF THE INVENTION

An object of the present invention is to provide a novel circuit for operating a HID lamp. The circuit includes an H-bridge connected between a common terminal (e.g., ground) and a power line, and a control circuit connected to the H-bridge. The control circuit includes a transformer having a primary winding connected between the common terminal and a power terminal and a secondary winding connected between the common terminal and the power line, and a current sense resistor connected in series between the secondary winding and the common terminal. The HID lamp is connected to the common terminal and to the second winding so as to sense a current across the current sense resistor.

The current sense resistor monitors the current output of the secondary winding, eliminating or reducing the influence of larger boost circuit currents. The voltage drop across the current sense resistor is not in the ground path driving the FETs of the H-bridge.

BRIEF DESCRIPTION OF THE DRAWING

The FIGURE is a circuit diagram of an embodiment of the circuit of the present invention.

DESCRIPTION OF PREFERRED EMBODIMENTS

An embodiment of the present invention is depicted in the FIGURE. As shown therein, a circuit 10 for operating a HID lamp includes an H-bridge 12 connected between a common terminal 14, such as ground, and a power line 16. The H-bridge 12 has four field effect transistors (FETs) 18, where two of these FETs 18' have a first terminal 18a connected to the common terminal. The H-bridge 12 is connected to the HID lamp 20 at second terminals 18b of these two FETs.

The circuit 10 also includes a control circuit 30 connected to the H-bridge 12. The control circuit 30 includes a transformer 32 having a primary winding 32a connected between the common terminal 14 and a power terminal 34 and a secondary winding 32b connected between the common terminal 14 and the power line 16. The control circuit 30 also includes a current sense resistor 40 connected in series between the secondary winding 32b and the common terminal 14. The voltage drop across the current sense resistor 40 is not in the ground path driving the FETs 18 of the H-bridge 12.

The HID lamp 20 is also connected to the common terminal 14 and to the secondary winding 32b so as to sense a current across the current sense resistor 40. The circuitry for using the current sensed by current sense resistor 40 to control lamp power is known and is not part of the present invention.

The current sense resistor 40 monitors the current output of the secondary winding 32b, eliminating or reducing the influence of large boost circuit currents that may be present during lamp starting.

The control circuit may also include a switch 42, such as a transistor, connected in series between the primary winding 32a and the common terminal 14 and a further connection 44 connected in parallel with the switch 42 between the primary winding 32a and the common terminal 14, where the further connection includes a capacitor 46 and a resistor 48 connected in series.

While embodiments of the present invention have been described in the foregoing specification and drawings, it is to be understood that the present invention is defined by the following claims when read in light of the specification and drawings.

We claim:

1. A circuit for operating a high intensity discharge (HID) lamp, comprising:

an H-bridge connected between a common terminal and a power line, said H-bridge having four field effect transistors (FETs), two of said FETs having a first terminal connected to the common terminal, said H-bridge being connected to the HID lamp at second terminals of said two FETs; and a control circuit connected to said H-bridge, said control circuit comprising a transformer having a primary winding connected between the common terminal and a power terminal and a secondary winding connected between the common terminal and the power line, and a current sense resistor connected in series between said secondary winding and the common terminal, the HID lamp being connected to the common terminal and to said second winding to sense a current across said current sense resistor.

2. The circuit of claim 1, wherein said control circuit comprises a switch connected in series between said primary winding and the common terminal and a further connection connected in parallel with said switch between said primary winding and the common terminal, said further connection having a capacitor and a resistor connected in series.

* * * * *